(12) United States Patent
Nitzan et al.

(10) Patent No.: US 9,672,094 B1
(45) Date of Patent: Jun. 6, 2017

(54) INTERCONNECT CIRCUITRY FAULT DETECTION

(71) Applicant: Xilinx, Inc., San Jose, CA (US)

(72) Inventors: Meirav O. Nitzan, Sunnyvale, CA (US); Edmond Jordan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 109 days.

(21) Appl. No.: 14/523,775

(22) Filed: Oct. 24, 2014

(51) Int. Cl.
 *G06F 11/00* (2006.01)
 *G06F 11/07* (2006.01)
 *G06F 13/20* (2006.01)
 *G06F 11/22* (2006.01)

(52) U.S. Cl.
 CPC ........ *G06F 11/079* (2013.01); *G06F 11/0745* (2013.01); *G06F 11/221* (2013.01); *G06F 13/20* (2013.01)

(58) Field of Classification Search
 CPC ............... G06F 11/221; G06F 11/3027; G06F 11/2236; G06F 11/2215
 See application file for complete search history.

(56) References Cited

U.S. PATENT DOCUMENTS

| | | | | |
|---|---|---|---|---|
| 6,134,682 A * | 10/2000 | Oakland | ............... | G06F 11/221 326/56 |
| 6,505,317 B1 * | 1/2003 | Smith | ............ | G01R 31/318505 714/724 |
| 6,609,221 B1 * | 8/2003 | Coyle | ................... | G06F 11/221 714/715 |
| 2004/0210798 A1 * | 10/2004 | Higashi | .......... | G01R 31/318307 714/27 |
| 2009/0168525 A1 * | 7/2009 | Olbrich | ............... | G06F 13/1657 365/185.11 |
| 2013/0061094 A1 * | 3/2013 | Busch | .................. | G06F 11/2215 714/27 |
| 2013/0151900 A1 * | 6/2013 | Wang | ..................... | G06F 11/321 714/27 |
| 2015/0193297 A1 * | 7/2015 | Ngo | ........................ | G06F 11/221 714/758 |
| 2015/0193298 A1 * | 7/2015 | Ngo | ........................ | G06F 11/08 714/758 |

* cited by examiner

Primary Examiner — Yolanda L Wilson
(74) Attorney, Agent, or Firm — Kevin T. Cuenot

(57) ABSTRACT

Fault detection for an interconnect bus includes performing safety register validation including validating correct operation of a safety register in a slave circuit. The safety register is reserved for validation operations. Write bus validation is performed where, over an address range of the slave circuit, received write addresses within the address range are stored in the safety register of the slave circuit and read back by a master circuit for validation. Read bus validation is performed where, over the address range of the slave circuit, received read addresses within the address range are provided back to the master circuit for validation.

20 Claims, 10 Drawing Sheets

US 9,672,094 B1

INTERCONNECT CIRCUITRY FAULT DETECTION

FIELD OF THE INVENTION

This disclosure relates to circuits and, more particularly, to fault detection in interconnect circuitry.

BACKGROUND

There are a variety of different types of faults that may affect an electronic system. In general, faults may be classified as systematic faults or random faults. A systematic fault is one that occurs as a result of a manufacturing defect. A systematic fault, for example, may be a defect, e.g., a "bug," in electronic hardware and/or in software. Systematic faults may be addressed through implementation of best practices including a variety of checks performed throughout development and manufacturing of the electronic system.

A random fault is one that may occur due to aging of the electronic system, environmental conditions, or the like. Two examples of random faults include "Single Event Upsets" (SEUs) and "stuck-at faults." An SEU is a condition where a circuit element changes state as a result of a charged particle impacting at or near a transistor junction. The collision of the charged particle with the junction can induce an upset to the state of the transistor. In the case of a memory cell, the change in state is a bit flip where the value of a bit stored in the memory cell changes from a 0 to a 1 or from a 1 to a 0.

A stuck-at fault is a type of defect where application of a particular signal value or values to a circuit results in a logical error. For example, a stuck-at 1 fault is where a particular signal is expected to take on a value of 0 given a particular set of input values to the circuit, but instead takes on a value of 1. A stuck-at 0 fault is where a particular signal is expected to take on a value of 1 given a particular set of input values to the circuit, but instead takes on a value of 0.

The occurrence of a random fault, whether an SEU and/or a stuck-at fault, within an electronic system may result in a system failure. As such, detection of random faults is an important aspect of electronic system design. This is particularly true in the case of devices and/or systems that are considered to be "fail-safe." A fail-safe device or system is one that, in the event of a failure, is able to respond in a way that will not cause harm or, in the alternative, cause only a minimum amount of harm, to other devices or personnel.

SUMMARY

In one aspect, a method of fault detection for an interconnect bus includes performing safety register validation including validating correct operation of a safety register in a slave circuit. The safety register is reserved for validation operations. The method also includes performing write bus validation where, over an address range of the slave circuit, received write addresses within the address range are stored in the safety register of the slave circuit and read back by a master circuit for validation. The method further includes performing read bus validation where, over the address range of the slave circuit, received read addresses within the address range are provided back to the master circuit for validation.

In another aspect, a system includes a write bus validation circuit configured for operation on a write bus of an interconnect bus. The write bus validation circuit includes a write address master input, a write data master input, a write address slave output, and a write data slave output. The write bus validation circuit further includes write bus switching circuitry coupled to the write address master input, the write data master input, the write address slave output, and the write data slave output. Responsive to initiation of a test mode in the write bus validation circuit, the write bus switching circuitry is configured to provide write addresses within an address range of a slave circuit received at the write address master input to the write data slave output and provide an address of a safety register of a slave circuit from the write address slave output.

In another aspect, a system includes a read bus validation circuit configured for operation on a read bus of an interconnect bus. The read bus validation circuit includes a read address master input, a read data master output, a read data slave input, and a read address slave output. The read bus validation circuit further includes read bus switching circuitry coupled to the read address master input, the read data master output, the read data slave input, and the read address slave output. Responsive to initiation of a test mode in the read bus validation circuit, the read bus switching circuitry is configured to provide read addresses within an address range of a slave circuit received at the read address master input to the read data master output.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
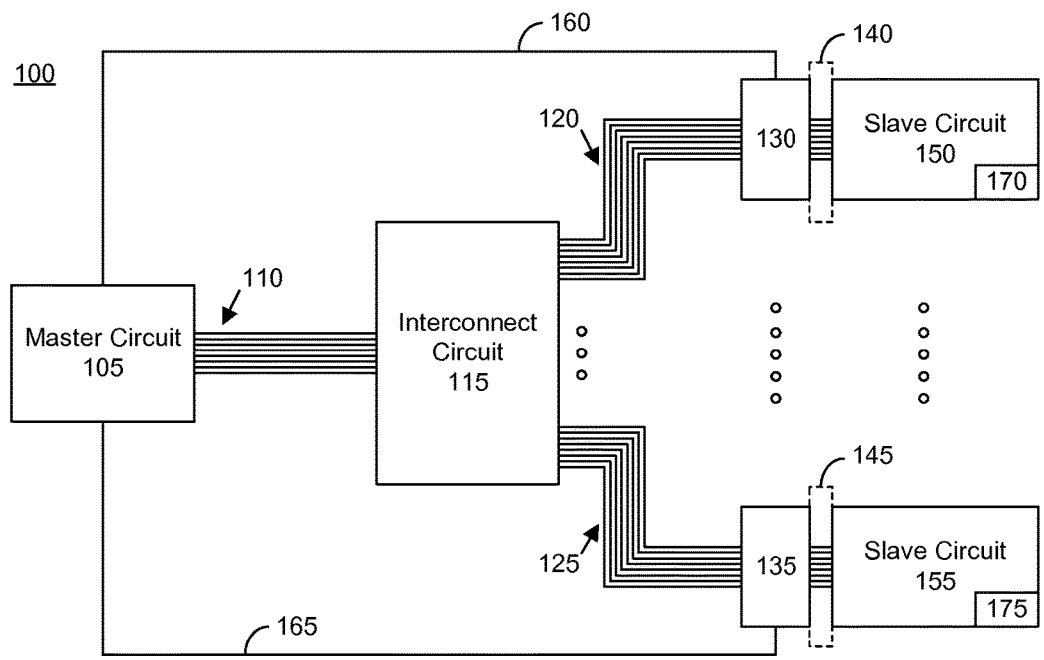
FIG. 1 is a block diagram illustrating an exemplary circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to circuits and, more particularly, to fault detection in interconnect circuitry. In accordance with the inventive arrangements described herein, random faults occurring within an interconnect bus may be detected. The detection techniques, referred to herein as "validation," "validation operations," or derivatives thereof, may be implemented with little or no disturbance of data stored within slave circuits of the interconnect bus. A bus validation circuit is incorporated into the interconnect bus for each slave circuit. The bus validation circuits operate in cooperation with the master circuit of the interconnect bus to perform interconnect bus validation. Further, each slave circuit includes a safety register or a plurality of safety registers such as a safety register array. The safety registers of slave circuits are utilized only for validation operations. The safety registers are otherwise unused, e.g., are not read or written, outside of the validation operations during normal operation of the slave circuits.

The inventive arrangements described herein may be implemented as a method or process performed using electronic circuitry, e.g., circuitry within an IC, circuitry implemented on a different carrier, etc. In another aspect, the inventive arrangements may be implemented as one or more circuits. The one or more circuits, whether implemented within an IC or using another carrier, may operate cooperatively as a system. In still another aspect, the inventive arrangements may be implemented as a non-transitory computer-readable storage medium storing a circuit design that, when loaded and/or otherwise implemented within an IC, including a programmable IC, implements one or more circuits within the IC configured to perform the various operations described within this disclosure.

Several definitions that apply throughout this document now will be presented. As defined herein, the term "fault" means a random fault. A random fault is an error that may occur in a circuit due to aging of the electronic system, environmental conditions, or the like. Two examples of random faults are "Single Event Upsets" (SEUs) and "stuck-at faults."

As defined herein, the term "signature" means a plurality of predetermined bit values having a predetermined order or sequence. In one aspect, the signature is stored in a safety register of a slave circuit and used only for validation operations. The term "validate," as defined herein, means to perform acts within circuitry that detect the occurrence, or lack of occurrence, of a fault. As defined herein, the term "validation operation" means an operation such as a read operation or a write operation directed to a slave circuit of an interconnect bus for the purpose of detecting a fault. Typically, at least one device on the interconnect bus is in a test mode of operation while performing a validation operation, though this need not be the case.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary circuit 100. In one aspect, circuit 100 may be implemented within an integrated circuit (IC). In another aspect, circuit 100 may be implemented on another type of circuit carrier and/or support system such as a printed circuit board, for example.

As pictured, circuit 100 includes a master circuit (master) 105, an interconnect circuit 115, one or more bus validation circuits 130 and 135, and one or more slave circuits (slaves) 150 and 155. Slave 150 includes a safety register 170. Slave 155 includes a safety register 175. As used within this disclosure, the term "safety register" may refer to one or more safety registers including, for example, a safety register array. In this regard, the number of actual safety registers included within each slave is sufficient to store a number of bits equal in size to the maximal size of the read and/or write address bus or the data bus coupled to the slave.

Master 105 is coupled to interconnect circuit 115 through wires 110. Interconnect circuit 115 is coupled to bus validation circuit 130 and bus validation circuit 135 through wires 120 and wires 125, respectively. Bus validation circuit 130 is coupled to slave 150 through wires 140. Bus validation circuit 135 is coupled to slave 155 through wires 145. As pictured, bus validation circuit 130 is located between slave 150 and interconnect circuit 115. Similarly, bus validation circuit 135 is located between slave 155 and interconnect circuit 115.

Circuit 100 is illustrated with two slaves. It should be appreciated that circuit 100 may include fewer slaves, e.g., one slave, or more than two slaves. For example, circuit 100 may include 4, 8, 16, or more slaves. The particular number of slaves included within circuit 100 may vary in accordance with the interconnect technology used, the intended functionality of circuit 100, the system in which circuit 100 is included, or a number of other design concerns. A bus validation circuit, however, is included for each slave.

In general, circuit 100 represents an interconnect bus. An interconnect bus typically includes one or more processors as masters coupled to one or more slaves through an interconnect circuit and wires. For purposes of illustration, the example of FIG. 1 includes a single master, though more than one master may be included. Master 105 may be implemented as a processor or other circuitry that executes program code. Master 105 may include test mode program code that may be executed to place master 105 in a test mode of operation. The test mode program code may be included or incorporated within user program code loaded within master 105 for execution. Master 105 is in a normal mode of operation while executing user program code, e.g., program code other than the test mode program code.

Interconnect circuit 115 facilitates communication between master 105 and slaves 150 and 155. In one example, interconnect circuit 115 may be implemented as an AXI Interconnect Intellectual Property (IP). An AXI Interconnect IP, or circuit block, is configured to couple one or more AXI memory-mapped master devices, or circuits, to one or more memory-mapped slave devices, or circuits. The AXI interconnect IP conforms to the AMBA® AXI version 4 specifications from ARM® Ltd. of Cambridge, United Kingdom.

Those skilled in the art will recognize that other interconnects may be used and that the inventive arrangements disclosed herein are not intended to be limited by the particular type of interconnect used. Further, the inventive arrangements are not intended to be limited by the particular version number of the specification of the interconnect technology referenced herein.

Each of bus validation circuits 130 and 135 is configured to implement a normal mode of operation (normal mode) and a test mode of operation (test mode). Bus validation circuit 130 may be placed in the normal mode or the test mode responsive to mode select signal 160 from master 105. Bus validation circuit 135 may be placed in the normal mode or the test mode responsive to mode select signal 165 from master 105.

While in normal mode, bus validation circuits 130 and 135 are transparent to master 105, interconnect circuit 115, and slaves 150 and 155. For example, with bus validation circuit 130 operating in the normal mode, bus validation circuit 130 does not interfere with, or otherwise change, any signals carried on wires 120 and/or wires 140. Signals on wires 120 and 140 pass through bus validation circuit 130 unchanged. Similarly, with bus validation circuit 135 operating in the normal mode, bus validation circuit 135 does not interfere with, or otherwise change, any signals carried on wires 125 and/or wires 145.

In one aspect, the test mode for either one or both of bus validation circuits 130 and 135 may be applicable to only a write bus or to a read bus of the interconnect bus. For example, each of bus validation circuits 130 and/or 135 may include a read bus validation circuit and a write bus validation circuit to be described herein in greater detail. In general, however, the read bus validation circuit operates on wires and/or signals of the read bus of the interconnect bus. The write bus validation circuit operates on wires and/or signals of the write bus of the interconnect bus. Within each of bus validation circuits 130 and/or 135, the read bus validation circuit may be placed in the normal mode of operation or the test mode of operation independently of the write bus validation circuit. Similarly, within each bus validation circuit 130 and/or 135, the write bus validation circuit may be placed in the normal mode of operation or the test mode of operation independently of the read bus validation circuit. Further, bus validation circuit 130 may operate independently of bus validation circuit 135.

When in the test mode, bus validation circuit 130 conducts validation operations using safety register 170. While in the test mode, bus validation circuit 135 conducts validation operations using safety register 175. In general, safety register 170 is not used, e.g., not read or written, while bus validation circuit 130 and master 105 are in the normal mode. Similarly, safety register 175 is not generally used, e.g., read or written, while bus validation circuit 135 and master 105 are in the normal mode. One exception is the case where safety register 170 and safety register 175 are initialized to store a signature. At least initially, each of safety registers 170 and 175 may be initialized by master 105 with a signature during a boot-up process for the IC or other system in which circuit 100 is located, for example. While the safety registers are part of the "address range" or addressable range of the slaves, the safety registers are not utilized during normal operation of circuit 100. Safety registers 170 and 175 are reserved for use in performing validation operations.

In one aspect, including a safety register in each slave on the interconnect bus allows master 105 to conduct validation operations in coordination with any bus validation circuits without disturbing data in the addressable space of any slave. For example, master 105 may exercise addresses in the address space for a given slave, while the bus validation circuit for that slave is able to manipulate and/or redirect the addressing so that only the safety register within the slave is accessed. During the test mode, master 105 is able to perform validation operations across the address space of the various slaves, e.g., test each address within the address space of each slave, without disrupting information stored in the address space of slaves 150 and 155. Conventional bus validation techniques do disrupt information stored in the slaves as information within the address range is read and/or written.

Figure 2:
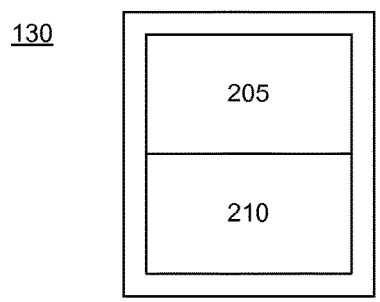
FIG. 2 is a block diagram illustrating an exemplary bus validation circuit.

FIG. 2 is a block diagram illustrating an exemplary bus validation circuit. More particularly, FIG. 2 illustrates an exemplary implementation of bus validation circuit 130 of FIG. 1. As pictured, bus validation circuit 130 includes a bus write validation circuit 205 and a bus read validation circuit 210. It should be appreciated that the architecture illustrated in FIG. 2 also may be used to implement bus validation circuit 135 of FIG. 1.

Figure 3:
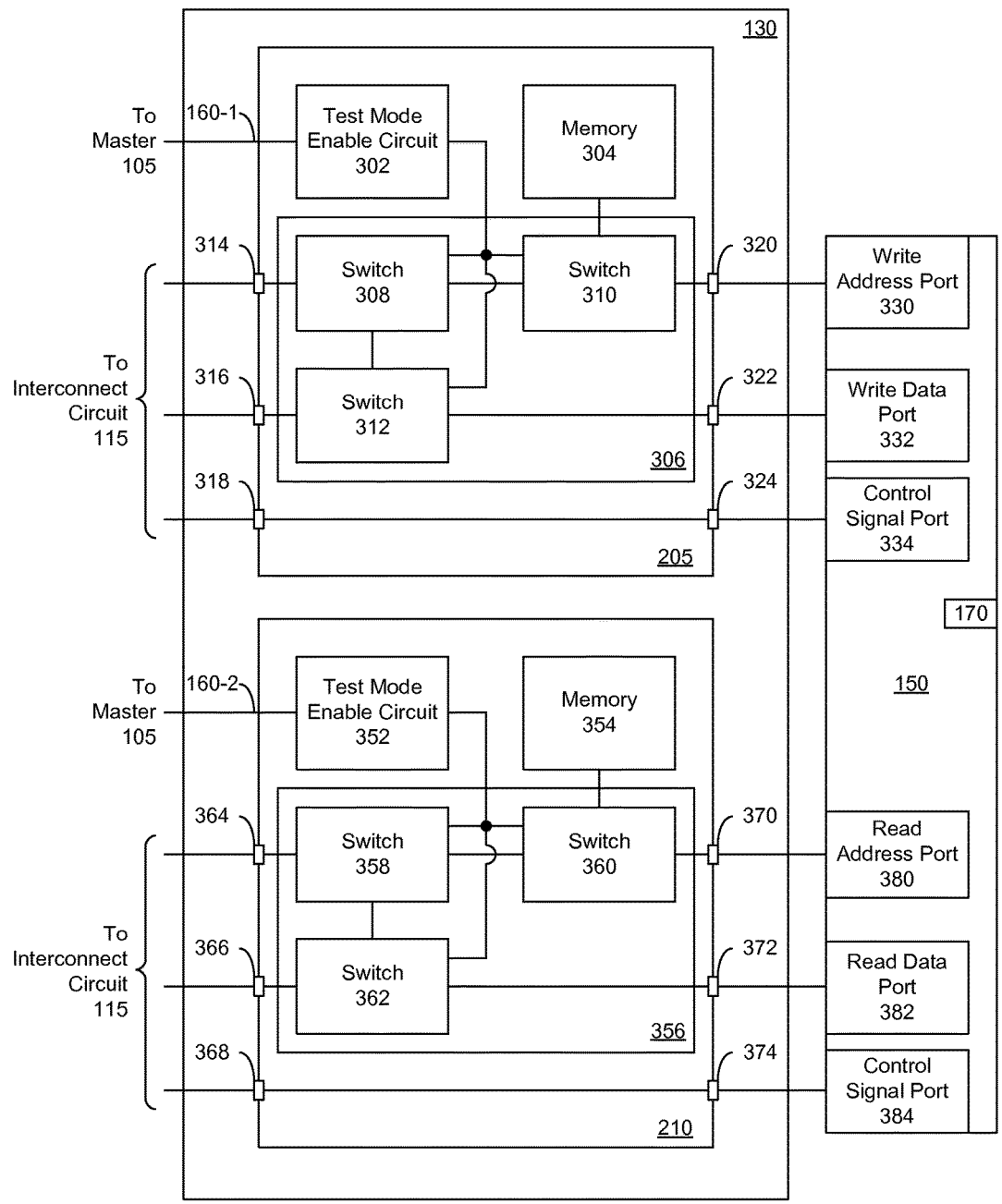
FIG. 3 is a block diagram illustrating an exemplary implementation of the bus validation circuit of FIG. 2.

FIG. 3 is a block diagram illustrating an exemplary implementation of bus validation circuit 130 of FIGS. 1 and 2. As pictured, bus validation circuit 130 includes write bus validation circuit 205 and read bus validation circuit 210.

Write bus validation circuit 205 includes a test mode enable circuit 302, a memory 304, and switching circuitry 306. Write bus validation circuit 205 further includes a write address master input 314, a write data master input 316, a control signal master port 318, a write address slave output 320, write data slave output 322, and a control signal slave port 324. Write address slave output 320 is coupled to write address port 330 of slave 150. Write data slave output 322 is coupled to write data port 332 of slave 150. Control signal slave port 324 is coupled to control signal port 334 of slave 150.

Write bus validation circuit 205 may be placed in either normal mode or test mode responsive to mode select signal 160-1. Mode select signal 160-1 is generated by, and provided from, master 105. For example, master 105 may generate mode select signal 160 as required to implement bus validation operations. In general, test mode enable circuit 302, responsive to mode select signal 160-1, places switching circuitry 306 in an appropriate state to implement the selected mode of operation. In one example, switching circuitry 306 includes switch 308, switch 310, and switch 312. Each of switches 308, 310, and 312 may be controlled by test mode enable circuit 302 to implement the signal switching and/or routing described herein.

For example, responsive to mode select signal 160-1 selecting normal mode, test mode enable circuit 302 sets switching circuitry 306 to pass signals between interconnect circuit 115 and slave 150 without any modification or alteration in signal value and/or routing, e.g., signal path. Accordingly, while in normal mode, a write address received from master 105 at write address master input 314 is propagated to write address slave output 320 and on to write address port 330. In normal mode, data to be written from master 105 that is received at write data master input 316 is propagated to write data slave output 322 and on to write data port 332.

Since control signal master port 318 and control signal slave port 324 are coupled together without traversing through switching circuitry, control signals are passed between control signal master port 318 and control signal slave port 324 without modification and/or alteration of signal value and/or routing whether write bus validation circuit 205 is in the normal mode or the test mode.

For example, responsive to mode select signal 160-1 selecting test mode of operation, test mode enable circuit 302 sets switching circuitry 306 differently than described for the normal mode. In general, write addresses received from master 105 are written to safety register 170 of slave 150 and read back through the read bus of the interconnect bus in an iterative manner to be described herein in greater detail.

In test mode, switch 308 and switch 312 are set to couple write address master input 314 to write data slave output 322. Thus, any write address received from master 105 is provided to write data port 332 as data to be written to slave 150. Switch 312 further decouples write data slave output 322 from write data master input 316. Switch 310 is set to provide an address of safety register 170, which is stored in memory 304, to write address slave output 320. Thus, slave 150 stores the write address sent from master 105, now received as data, within safety register 170 per the write address received at write address port 330.

Read bus validation circuit 210 includes a test mode enable circuit 352, a memory 354, and switching circuitry 356. Write bus validation circuit 210 further includes a read address master input 364, a read data master output 366, a control signal master port 368, a read address slave output 370, read data slave input 372, and a control signal slave port 374. Read address slave output 370 is coupled to read address port 380 of slave 150. Read data slave input 372 is coupled to read data port 382 of slave 150. Control signal slave port 374 is coupled to control signal port 384 of slave 150.

Read bus validation circuit 210 may be placed in either normal mode or test mode responsive to mode select signal 160-2. Mode select signal 160-2 is generated by, and provided from, master 105. For example, master 105 may generate mode select signal 160 as required to implement bus validation operations. In general, test mode enable circuit 352, responsive to mode select signal 160-2, places switching circuitry 356 in an appropriate state to implement the selected mode of operation. In one example, switching circuitry 356 includes switch 358, switch 360, and switch 362. Each of switches 358, 360, and 362 may be controlled by test mode enable circuit 352 to implement the signal switching and/or routing described herein.

For example, responsive to mode select signal 160-2 selecting normal mode, test mode enable circuit 352 sets switching circuitry 356 to pass signals between interconnect circuit 115 and slave 150 without any modification or alteration in signal value and/or routing, e.g., signal path. Accordingly, while in normal mode, a read address received from master 105 at read address master input 364 is propagated to read address slave output 370 and on to read address port 380. In normal mode, data that is read from slave 150 that is output from read data port 382 is received at read data slave input 372, is propagated to read data master output 366, and provided to master 105.

Since control signal master port 368 and control signal slave port 374 are coupled together without traversing through switching circuitry, signals are passed between control signal master port 368 and control signal slave port 374 without modification and/or alteration of signal value and/or routing whether read bus validation circuit 210 is in the normal mode or the test mode.

Responsive to mode select signal 160-2 selecting the test mode, test mode enable circuit 352 sets switching circuitry 356 differently than described for the normal mode. In test mode, switch 358 and switch 362 are set to couple read address master input 364 to read data master output 366. Thus, any read address received from master 105 is provided back to master 105 for comparison and/or other validation operation performed therein. Switch 360 is optionally set to provide an address of safety register 170, which is stored in memory 354, to read address slave output 370. Switch 362 further decouples read data slave input 372 from read data master output 366.

Figure 4:
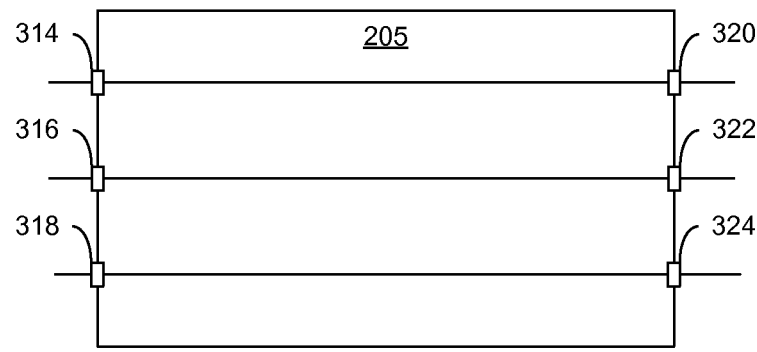
FIG. 4 is a block diagram showing a simplified illustration of normal mode of operation for a write bus validation circuit.

FIG. 4 is a block diagram showing a simplified illustration of normal mode for write bus validation circuit 205. For purposes of clarity, aspects of write bus validation circuit 205 such as switching circuitry, the memory, and the test mode enable circuit are not shown in order to more clearly illustrate signal paths. As pictured, responsive to being placed in normal mode, write address master input 314 is coupled to write address slave output 322. Write data master input 316 is coupled to write data slave output 322. Control signal master port 318 is coupled to control signal slave port 324.

Figure 5:
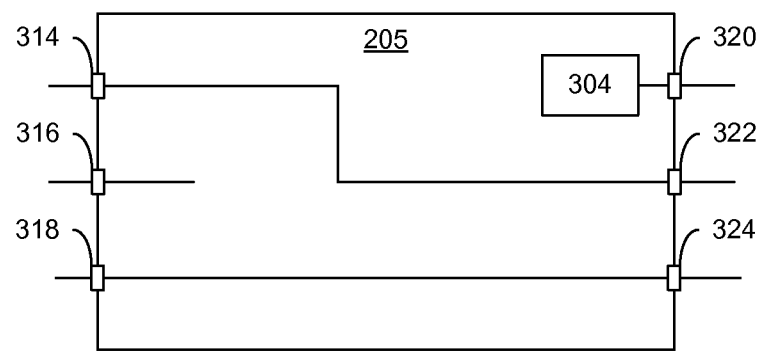
FIG. 5 is a block diagram showing a simplified illustration of test mode of operation for a write bus validation circuit.

FIG. 5 is a block diagram showing a simplified illustration of test mode for write bus validation circuit 205. Again, for purposes of clarity, aspects of write bus validation circuit 205 such as switching circuitry and the test mode enable circuit are not shown in order to more clearly illustrate signal paths. As pictured, responsive to being placed in test mode, write address master input 314 is decoupled from write address slave output 320. Write data slave output 322 is decoupled from write data master input 316. Write address master input 314 is coupled to write data slave output 322. Memory 304 is coupled to write address slave output 322. Control signal master port 318 remains coupled to control signal slave port 324.

Figure 6:
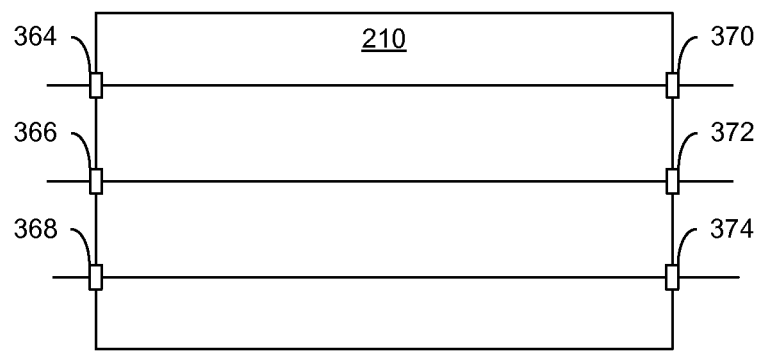
FIG. 6 is a block diagram showing a simplified illustration of normal mode of operation for a read bus validation circuit.

FIG. 6 is a block diagram showing a simplified illustration of normal mode for read bus validation circuit 210. For purposes of clarity, aspects of read bus validation circuit 210 such as switching circuitry, the memory, and the test mode enable circuit are not shown in order to more clearly illustrate signal paths. As pictured, responsive to being placed in normal mode, read address master input 364 is coupled to read address slave output 370. Read data master output 366 is coupled to read data slave input 372. Control signal master port 368 is coupled to control signal slave port 374.

Figure 7:
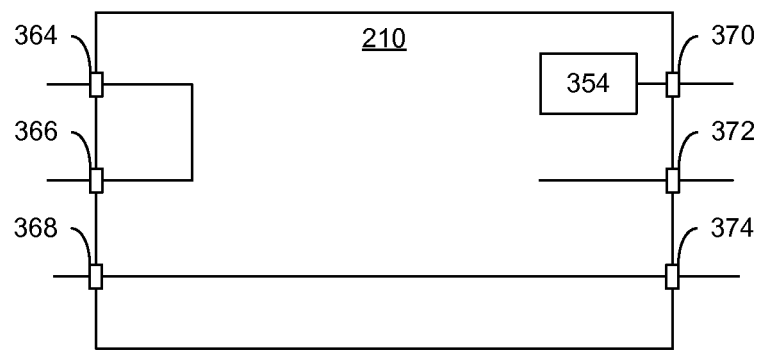
FIG. 7 is a block diagram showing a simplified illustration of test mode of operation for a read bus validation circuit.

FIG. 7 is a block diagram showing a simplified illustration of test mode for read bus validation circuit 210. Again, for purposes of clarity, aspects of read bus validation circuit 210 such as switching circuitry and the test mode enable circuit are not shown in order to more clearly illustrate signal paths. As pictured, responsive to being placed in test mode operation, read address master input 364 is decoupled from read address slave output 370. Read data master output 366 is decoupled from read data slave input 372. Read address master input 364 is coupled to read data master output 366, forming a loop-back path. In one aspect, memory 354 is optionally coupled to read address master output 370. Control signal master port 368 remains coupled to control signal slave port 374.

Figure 8:
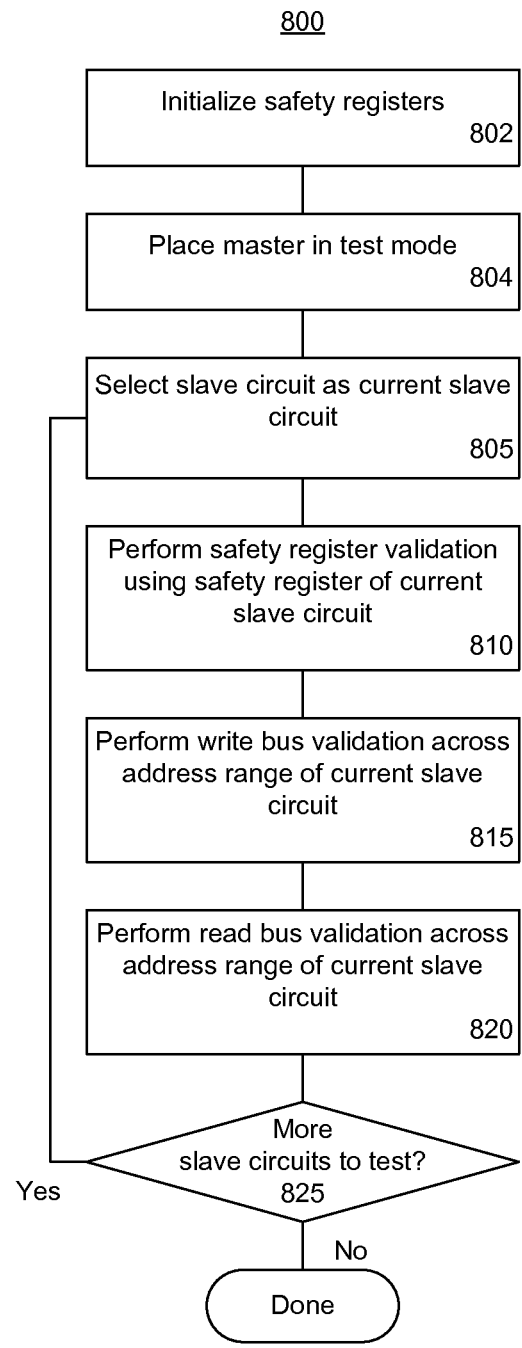
FIG. 8 is a flow chart illustrating an exemplary method of validating an interconnect bus.

FIG. 8 is a flow chart illustrating an exemplary method 800 of validating an interconnect bus. Method 800 may be performed by a system as described with reference to FIG. 1. For example, method 800 may be performed using the master in combination with one or more slaves and a bus validation circuit for each slave. The master may include program code that, when executed, places the master in a test mode thereby programming the master to perform validation operations. Upon completion of the validation operations, the master may return to normal mode where user program code is executed.

In block 802, the master initializes each slave to store a signature therein. Initialization of the safety registers may be performed by the master during an initialization and/or boot-up process within the IC or other electronic system. In another aspect, the master may write the signature into the safety registers during at some point prior to the start of testing, e.g., prior to implementation of the test mode. In block 804, the master is placed in the test mode. Once test mode is implemented, the value stored in the safety registers are not changed without the master being aware of the change.

In block 805, a slave is selected as the current slave for performing validation operations. The slave is selected from the plurality of slaves on the interconnect bus. In one aspect, the master, having entered test mode, selects the slave from the plurality of slaves on the interconnect bus.

In block 810, safety register validation is performed. Safety register validation ensures correct operation of the safety register in the current slave. As discussed, the safety register is reserved for validation operations. The safety register is not read or written unless the bus validation circuit associated with the current slave and/or the master is in the test mode. As discussed, however, an exception to this prohibition is that the safety register within each slave must be initially loaded with the signature before the start of testing, e.g., prior to the start of test mode, as previously described with reference to block 802.

In block 815, a write bus validation is performed. Write bus validation is performed over the entire address range of the current slave. It should be appreciated, however, that since the safety register has been validated, the safety register need not be rechecked as part of the write bus validation process. In one aspect, write bus validation involves receiving a write address in the address range of the current slave, storing the write address in the safety register, and reading the safety register for validation. As discussed, the number of actual safety registers that are written and read during write bus validation will depend upon the size of the write address bus. The validation operations may be performed sequentially and iterated over the entire address range of the current slave.

In block 820, a read bus validation is performed. Read bus validation is performed over the entire address range of the current slave. It should be appreciated, however, that since the safety register has been validated, the safety register need not be rechecked as part of the read bus validation process. In one aspect, read bus validation involves receiving a read address within the address range of the current slave and providing the read address back to the master for validation. The validation operations may be iterated over the entire address range of the current slave.

In block 825, a determination is made whether there is at least one more slave to be tested. In one aspect, the master tracks tested slaves and makes the determination. If at least one more slave remains to be tested, method 800 loops back to block 805 to continue processing. If not, method 800 is done with validation operations. For example, the master and any other components and/or devices on the interconnect bus may return to the normal mode of operation.

Method 800 may be performed from time-to-time, e.g., responsive to the occurrence of predetermined events detected by the master, periodically, or upon request to the master by another system or circuit whether such request originates within the same IC and/or system or from an external system. In this regard, method 800 may be performed in-the-field as desired as opposed to only during testing of the IC prior to release of the IC to an end user or into the field.

Figure 9:
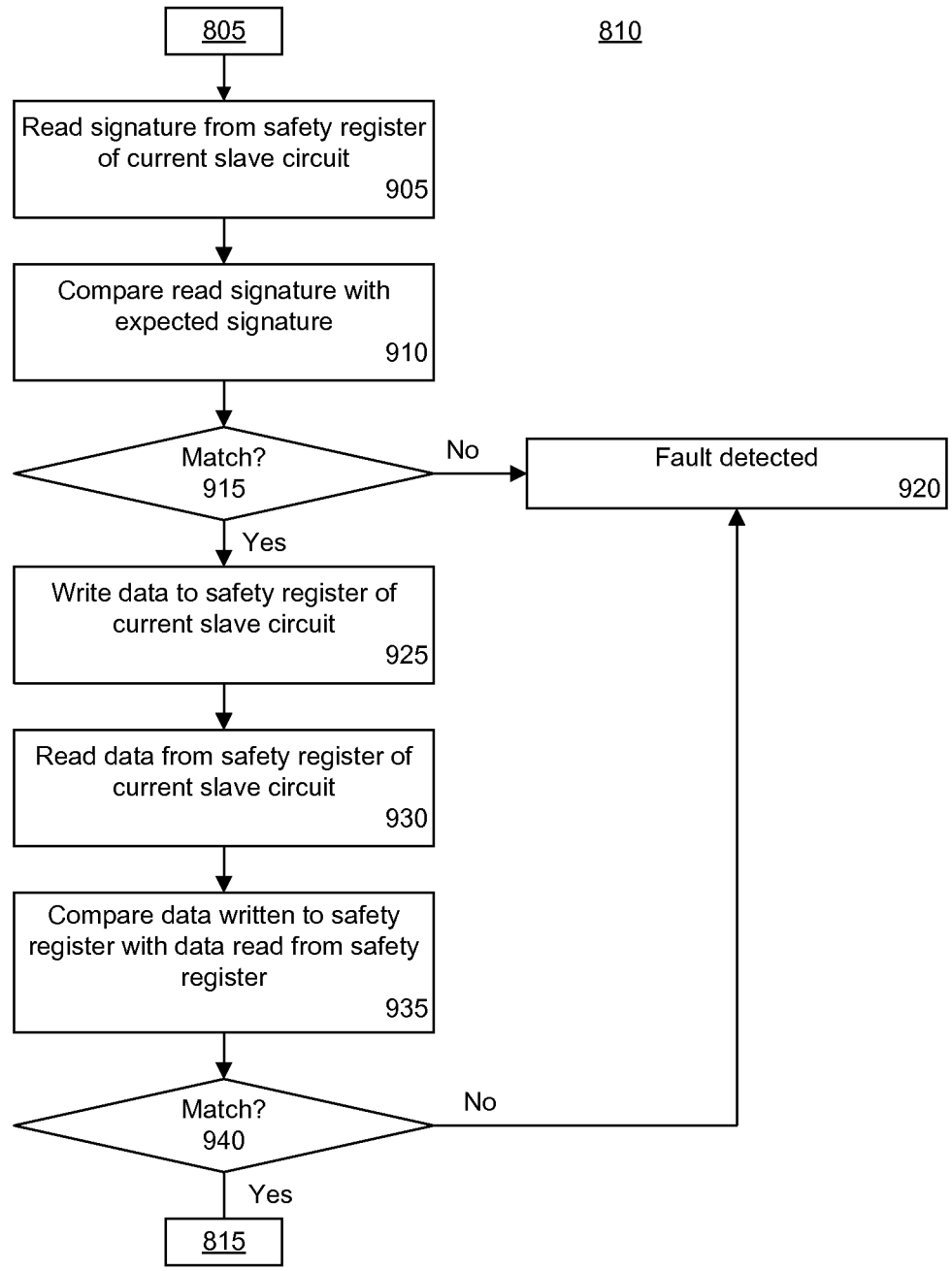
FIG. 9 is a flow chart illustrating an exemplary method of safety register validation.

FIG. 9 is a flow chart illustrating an exemplary implementation of block 810 of FIG. 8 for performing safety register validation. FIG. 9 begins in block 905 having proceeded from block 805 of FIG. 8. For purposes of FIG. 9, the bus validation block for the current slave is in normal operation mode. Thus, during safety register validation, the master is in the test mode while the bus validation circuit is in the normal mode. Both the read bus validation circuit and the write bus validation circuit are in normal mode. Further, it should be appreciated that read operations take place over the read bus of the interconnect bus while write operations take place over the write bus of the interconnect bus.

In block 905, the master reads a signature from the safety register of the current slave. For example, the master initiates a read operation directed to the safety register of the current slave. In reading the signature from the safety register, the master is exercising the lines of the read bus of the interconnect bus to ensure correct operation. In block 910, the master, having received the signature read from the current slave, compares the signature with an expected signature. The master, for example, may be programmed with an expected signature for the current slave. The signature stored in the safety register of each slave may be the same signature or a different signature. In any case, the master is programmed with the expected signature for each slave for purposes of comparison.

In block 915, the master determines whether the signature read from the safety register of the current slave matches the expected signature. If so, the method continues to block 925. If not, the method proceeds to block 920, where a fault is detected. In one aspect, detecting a fault may include the master outputting a value, e.g., a flag, bit, or other code indicating the detection of a fault. The value may be output to a particular pin and/or output, e.g., stored, in a register, memory, etc., of the system and/or circuitry within which the master is located. Such a location storing the indication of the fault may be read by another system. In one aspect, the value that is output may indicate the particular phase of validation where the fault is detected in reference to blocks 810, 815, and/or 820. The value further may indicate the identity of the current slave where the fault is detected.

In general, blocks 905, 910, and 915, taken collectively, ensure that the safety register of the current slave may be read by the master without fault. Blocks 925, 930, 935, and 940, taken collectively, ensure that the safety register of the slave may be written by the master without fault.

In block 925, the master writes data to the safety register of the current slave. For example, the master initiates a write operation directed to the safety register of the current slave. In one aspect, the master may write data to the entire safety register. The master may write data comprising the same number of bits as the safety register itself. In another aspect, the master may write an amount of data to the safety register that has fewer bits than the size of the safety register. For example, in some cases, writing data that is the same size as the safety register may require more than one clock cycle. In that case, the data written to the safety register may be an amount, or a maximum amount, that may be written to the safety register in a single clock cycle.

In block 930, the master reads data from the safety register of the current slave, e.g., initiates a read operation directed to the safety register of the current slave. In block 935, the processor compares the data written to the safety register with the data read from the safety register in block 930. In block 940, the master determines whether the data written to the safety register matches the data read from the safety register. If a match is determined, the method proceeds to block 815. If no match is determined, the method continues to block 920, where a fault is detected as previously described.

Figure 10:
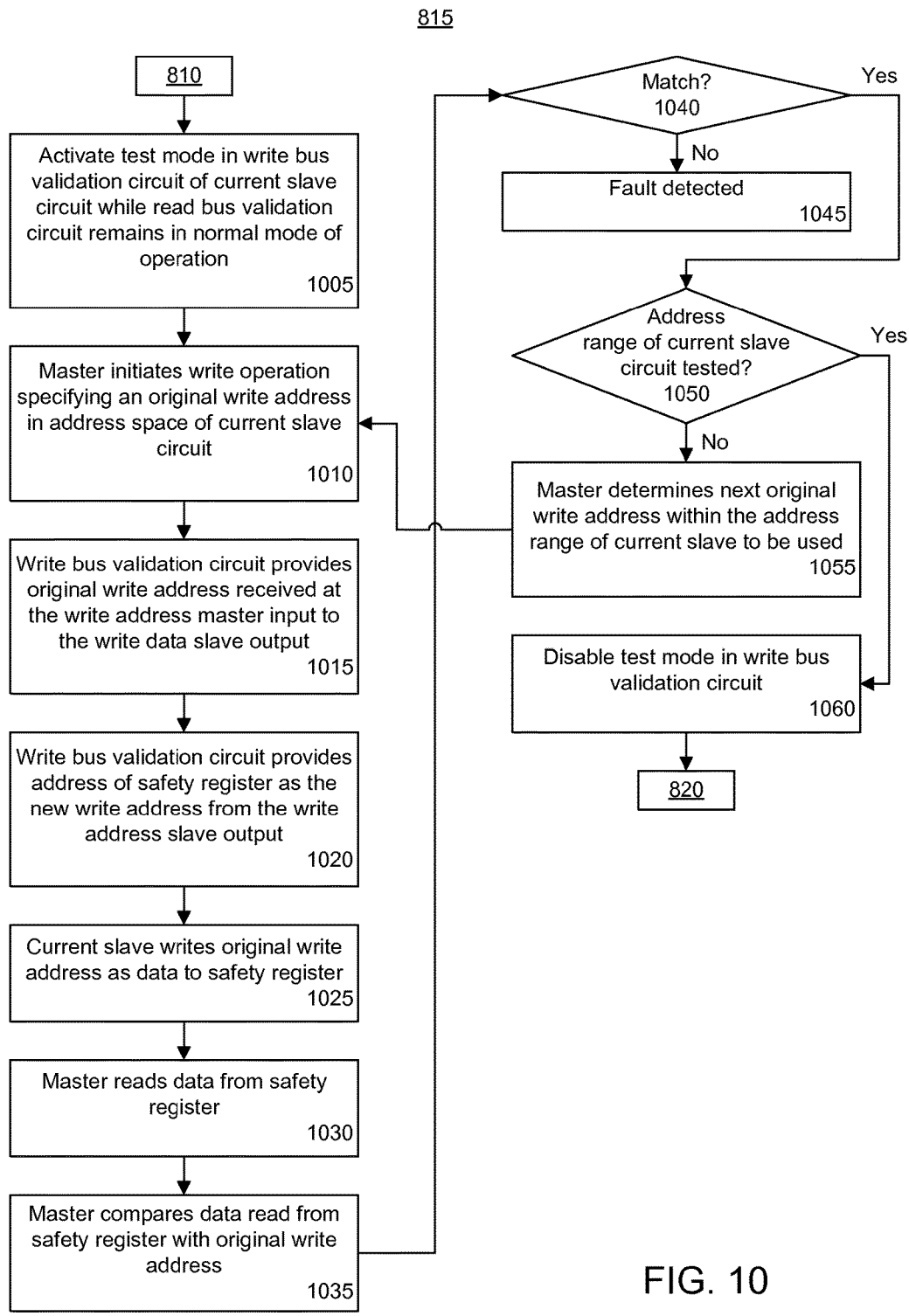
FIG. 10 is a flow chart illustrating an exemplary method of write bus validation.

FIG. 10 is a flow chart illustrating an exemplary implementation of block 815 of FIG. 8 for performing write bus validation. FIG. 10 begins in block 1005 having completed safety register validation of block 810 of FIG. 8. For purposes of FIG. 10, the master remains in test mode. As previously noted, read operations take place over the read bus of the interconnect bus while write operations take place over the write bus of the interconnect bus.

In block 1005, the master enables the test mode in the write bus validation circuit associated with the current slave circuit. The read bus validation circuit remains in the normal mode. Responsive to the mode select signal indicating test mode, the write bus validation circuit performs operations internally including: decoupling the write address master input from the write address slave output, decoupling the write data master input from the write data slave output, and coupling the write address master input to the write data slave output. Further, the memory storing the address of the safety register within the write bus validation circuit is coupled to the write address slave output.

In block 1010, the master initiates a write operation on the write bus. The write operation specifies an original write address that is within the address space of the current slave circuit. In block 1015, the write bus validation circuit provides the original write address received at the write address master input to the write data slave output. The original write address is output from the write bus validation circuit as "data" to be written to a designated address within the current slave. In block 1020, the write bus validation circuit provides the address of the safety register as the new write address from the write address slave output. It should be appreciated that any data received at the write data master input as part of the write operation specifying the original write address is prevented from passing through to the write data slave output.

Accordingly, in block 1025, the current slave writes the original write address as data to the safety register. In block 1030, the master reads data from the safety register over the read bus. The master, for example, initiates a read operation directed to the safety register of the current slave. The data is read back via the read bus where the read bus validation circuit is in normal mode so as not to modify any signals passing between master and the current slave on the read bus.

In block 1035, the master compares the data read from the safety register with the original write address. In block 1040, the master determines whether the data read from the safety register matches the original write address. If so, the method continues to block 1050. If not, the method proceeds to block 1045, where a fault is detected. An indication of the fault, e.g., a value, may be output as previously described.

In block 1050, the master determines whether each address of the address range of the current slave has been tested for purposes of write bus validation. More particularly, the master determines whether each address within the address range of the current slave has been used as the "original write address" in block 1010. If so, the method continues to block 1060. If not, the method proceeds to block 1055.

In block 1055, the master determines a next original write address within the address range of the current slave to be used. The next original write address is one not yet tested, e.g., not yet used as the original write address in block 1010. The master may determine the next original address of the address range of the current slave in any of a variety of ways. For example, the master may start at the lower bound of the address range of the current slave and increment up through the address range ending at the upper bound of the address range. The master may start at the upper bound of the address range of the current slave and decrement down through the address range ending at the lower bound of the address range. The master may use an algorithm where the ordering of addresses of the address range used as the original write address for testing is not sequential. The particular order of addresses tested by the master is not intended to be limiting of the inventive arrangements described within this disclosure.

In block 1060, the master disables the test mode in the write bus validation circuit as write bus validation for the current slave is complete. The master, through the mode select signal, specifies normal mode operation. Responsive to the select signal indicating normal mode, the write bus validation circuit decouples memory storing the address of the safety register from the write address slave output, decouples the write address master input from the write data slave output, couples the write address master input to the write address slave output, and couples the write data master input to the write data slave output. After block 1060, the method continues to block 820.

Within FIG. 10, the control signals such as acknowledgements and the like that may pass between the master and the slave are not discussed. As previously described, the control signal ports on the write bus validation circuit continue to pass control signals such as acknowledgements between master and slave unimpeded and/or unaltered. Similarly, the control signal ports on the read bus validation circuit continue to pass control signals between master and slave unimpeded and/or unaltered.

Figure 11:
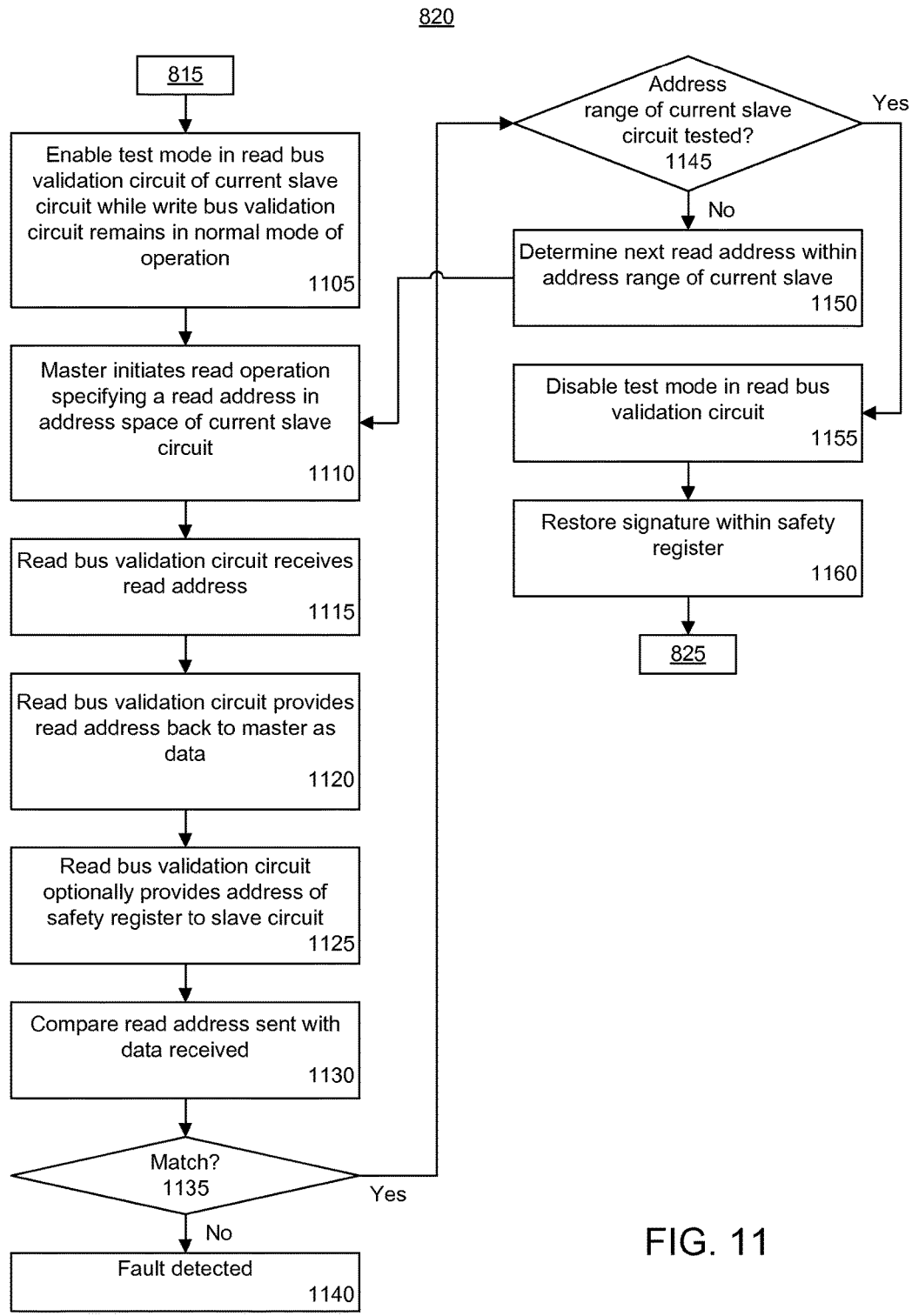
FIG. 11 is a flow chart illustrating an exemplary method of read bus validation.

FIG. 11 is a flow chart illustrating an exemplary implementation of block 820 of FIG. 8 for performing read bus validation. FIG. 11 begins in block 1105 having completed write bus validation of block 815 of FIG. 8. For purposes of FIG. 11, the master remains in test mode. As previously noted, read operations take place over the read bus of the interconnect bus while write operations take place over the write bus of the interconnect bus.

In block 1105, the master enables the test mode in the read bus validation circuit associated with the current slave circuit. The write bus validation circuit remains in the normal mode of operation. Responsive to the mode select signal indicating test mode, the read bus validation circuit performs operations internally including: decoupling the read address master input from the read address slave output, decoupling the read data master output from the read data slave input, and coupling the read address master input to the read data master output. Further, the memory storing the address of the safety register within the read bus validation circuit is optionally coupled to the read address slave output.

In block 1110, the master initiates a read operation. The read operation specifies a read address that is within the address space of the current slave circuit. In block 1115, the read bus validation circuit receives the read address. The read bus validation circuit receives the read address at the read address master input. In block 1120, the read bus validation circuit provides the read address received in block 1115 back to the master as data. The read bus validation circuit, for example, outputs the read address received in block 1115 from the read data master output.

In block 1125, the read bus validation circuit optionally provides the address of the safety register to the slave circuit. The read bus validation circuit may output the address of the safety register from the read address slave output. Data received from the current slave reading the safety register may be ignored, discarded, or the like. The data read from the safety register, however, is prevented from passing through the read bus validation circuit to the master.

In one aspect, providing the current slave with the address of the safety circuit prevents any inadvertent modification of data stored in the current slave through access to the particular read addresses being provided from the master. Further, by outputting the read address from the memory and initiating a read operation from the current slave, the master will receive the expected control signals for the read operation despite the read bus validation circuit implementing the "loop-back" function for the received read address. As noted, the control signal ports on the read bus validation circuit continue to pass control signals such as acknowledgements through between the master and the slave unimpeded and/or unaltered.

In block 1130, the master compares the read address sent in block 1115 with the data received in block 1120. In block 1135, the master determines whether the read address sent in block 1115 matches the data received in block 1125. If so, the method continues to block 1145. If not, the method proceeds to block 1140, where a fault is detected. A notification of the fault may be output as previously described.

In block 1145, the master determines whether each address of the address range of the current slave has been tested for purposes of read bus validation. More particularly, the master determines whether each address within the address range of the current slave has been used as the "read address" in block 1115. If so, the method continues to block 1155. If not, the method proceeds to block 1150.

In block 1150, the master determines a next read address within the address range of the current slave that is to be used for testing. The next read address is one not yet tested, e.g., not yet used as the read address in block 1115. The master may iterate through the addresses of the address range of the current slave in any of a variety of ways as previously discussed. The particular order of addresses tested by the master is not intended to be limiting of the inventive arrangements described within this disclosure.

In block 1155, the master disables the test mode in the read bus validation circuit. The master, through the mode select signal, specifies normal mode operation. Responsive to the select mode signal indicating normal mode of operation, the read bus validation circuit decouples the memory storing the address of the safety register from the read address slave output (if coupled), decouples the read address master input from the read data master output, couples the read address master input to the read address slave output, and couples the read data master output to the read data slave input.

In block 1160, the master restores the signature within the safety register of the current slave. For example, the master initiates a write operation that writes the signature to the safety register. As such, the safety register of the current slave is ready for subsequent testing starting with safety register validation as described in FIG. 8. After block 1160, the method continues to block 825.

FIG. 8-11 illustrate exemplary techniques for performing interconnect bus validation. The techniques described allow the entire address space of each slave to be tested while leaving data stored within each slave unchanged and intact. The safety register is used for purposes of reading and/or writing for the validation operations so as to make writing to other addresses of the address space of the slaves unnecessary. Thus, interconnect bus validation may be performed with minimized disturbance to the slaves and/or the data stored within the slaves.

Figure 12:
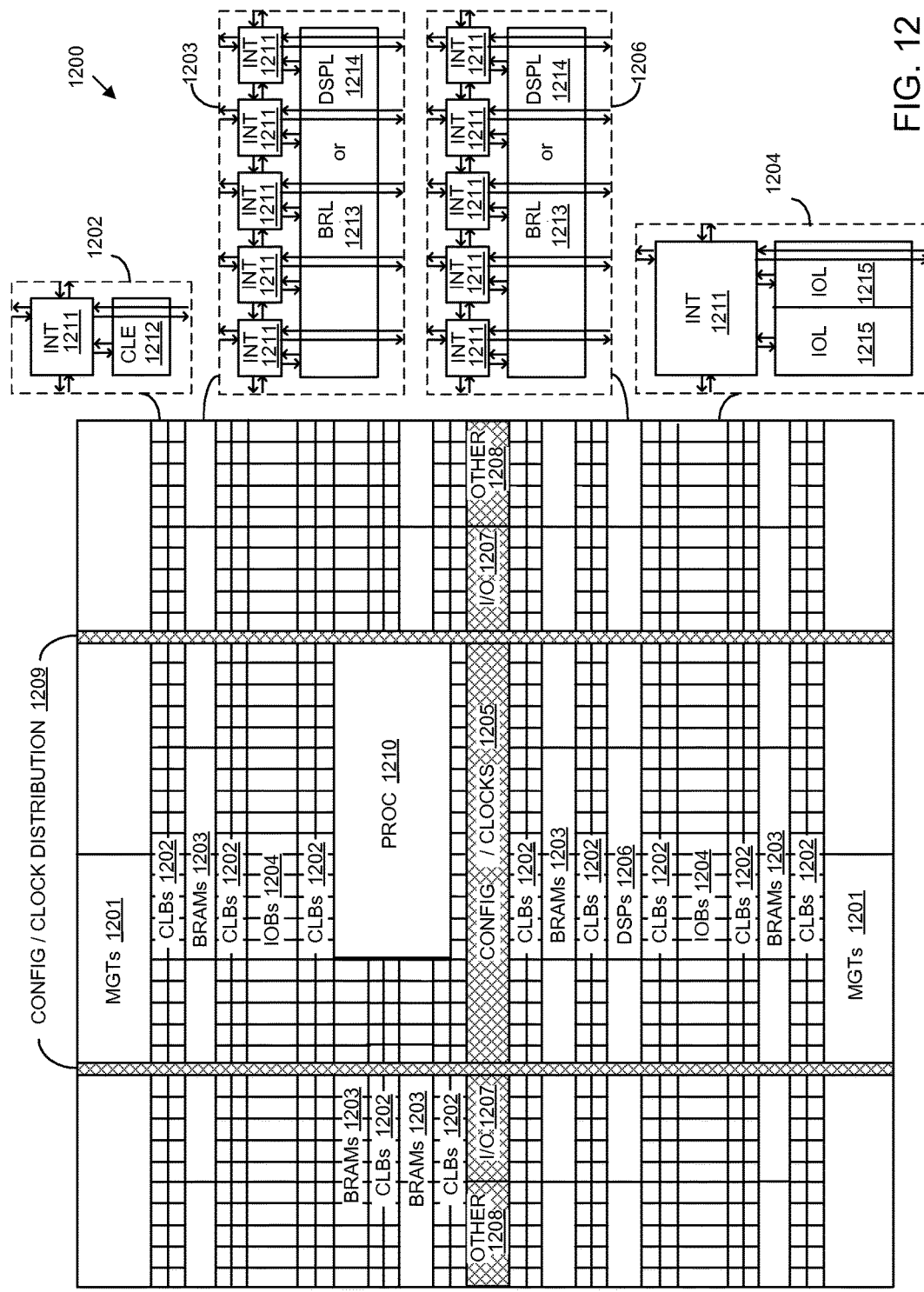
FIG. 12 is a block diagram illustrating an exemplary architecture for an integrated circuit (IC)

FIG. 12 is a block diagram illustrating an exemplary architecture 1200 for an IC. Architecture 1200 is presented as an example of an IC architecture in which the interconnect bus circuitry described herein and validation operations described herein may be implemented.

In one aspect, architecture 1200 is implemented within a field programmable gate array (FPGA) type of IC. Architecture 1200 is also representative of an SOC type of IC. As noted, an SOC is an IC that includes a processor that executes program code and one or more other circuits and/or circuit systems. The circuits and/or circuit systems may operate cooperatively with one another and with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the top of FIG. 12.

For example, a CLB 1202 can include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) may also be used. A DSP tile 1206 may include a DSP logic element (DSPL) 1214 in addition to an appropriate number of INTs 1211. An IOB 1204 may include, for example, two instances of an I/O logic element (IOL) 1215 in addition to one instance of an INT 1211. As will be clear to those of skill in the art, the actual I/O pads connected, for example, to IOL 1215 typically are not confined to the area of IOL 1215.

In the example pictured in FIG. 12, a columnar area near the center of the die, e.g., formed of regions 1205, 1207, and 1208, may be used for configuration, clock, and other control logic. Horizontal areas 1209 extending from this column are used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 is implemented as a dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 is omitted from architecture 1200 and replaced with one or more of the other varieties of the programmable blocks described. Further, such blocks may be utilized to form a "soft processor" in that the various blocks of programmable circuitry may be used to form a processor that executes program code as is the case with PROC 1210.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 12 that are external to PROC 1210 such as CLBs 1202 and BRAMs 1203 are considered programmable circuitry of the IC. Programmable circuitry may be configured or programmed to implement different physical circuits therein.

In general, the functionality of programmable circuitry is not established until configuration data is loaded into the IC. A set of configuration bits may be used to program programmable circuitry of an IC such as an FPGA. The configuration bit(s) are typically referred to as a "configuration bitstream." In general, programmable circuitry is not operational or functional without first loading a configuration bitstream into the IC. The configuration bitstream effectively implements or instantiates a particular physical circuit within the programmable circuitry. The configuration bitstream or circuit design specifies, for example, functional aspects of the programmable circuit blocks and physical connectivity among the various programmable circuit blocks that is otherwise non-existent. The configuration bitstream further specifies the values that may be loaded into the memory cells used to control operation of the programmable delays described herein.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 1210.

In terms of interconnect bus circuitry, the master may be implemented as PROC 1210 or as a soft processor. In one aspect, interconnect circuit 115 may be implemented as a hardwired circuit block, e.g., within or as part of PROC 1210. In another aspect, interconnect circuit 115 may be implemented within programmable circuitry of architecture 1200. Similarly, slaves coupled to the interconnect bus may be hardwired circuit blocks, soft circuit blocks implemented using programmable circuitry of architecture 1200, and/or include both hardwired circuit blocks and soft circuit blocks.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 12 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 12 are purely exemplary. In an actual IC, for example, more than one adjacent column of CLBs may be included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as a limitation.

Figure 13:
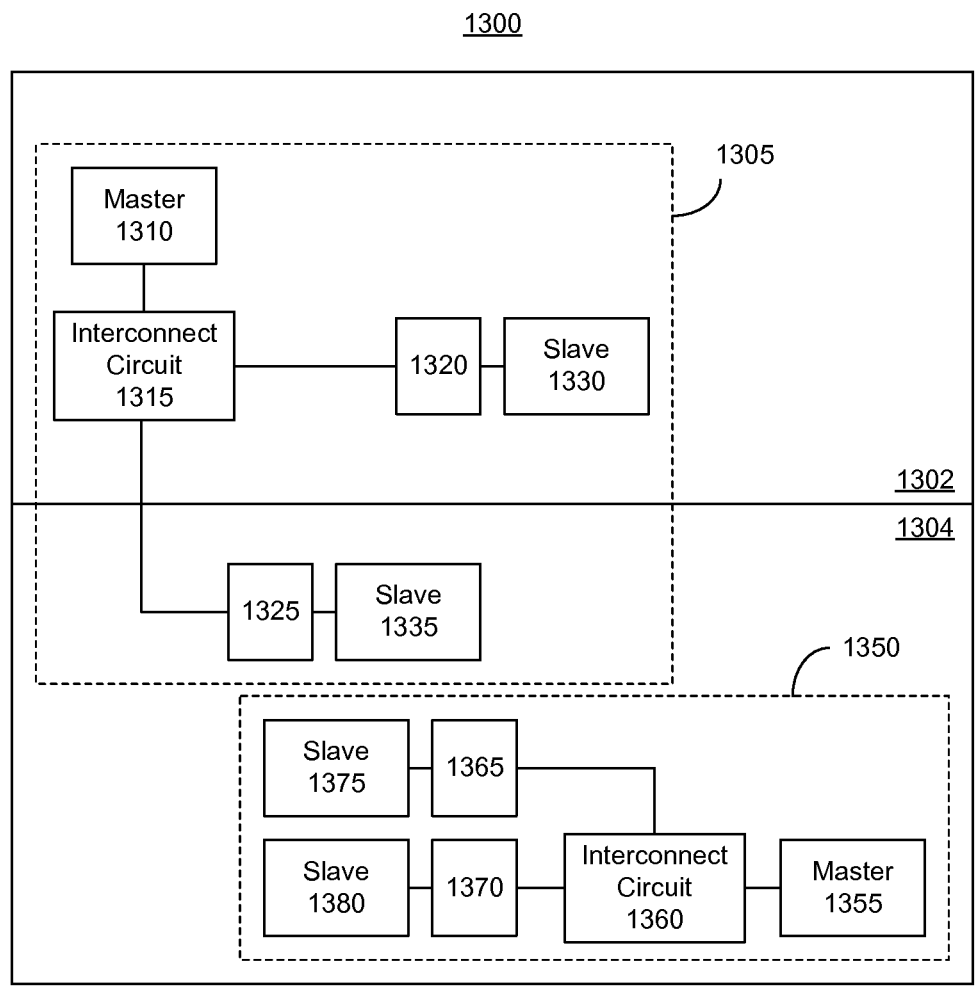
FIG. 13 is a block diagram illustrating an exemplary IC.

FIG. 13 is a block diagram illustrating an exemplary IC 1300. IC 1300 includes a processor system 1302 and a programmable circuitry portion 1304. Processor system 1302 may be implemented as a hardwired circuitry. Programmable circuitry portion 1304 may be implemented using one or more programmable circuit blocks as described with reference to FIG. 12, e.g., as an FPGA type of architecture where systems implemented within programmable circuitry portion 1304 are specified by loading a configuration bitstream into IC 1300 and may communicate with blocks in processor system 1302.

As pictured, IC 1300 includes an interconnect bus 1302 and an interconnect bus 1350. Two interconnect buses are shown for purposes of illustration. Interconnect bus 1305 includes a master 1310, an interconnect circuit 1315, bus validation circuits 1320 and 1325, and slaves 1330 and 1335. In the example of FIG. 13, master 1310 is a hardwired processor. Interconnect circuit 1315 is a hardwired circuit block. Bus validation circuit 1320 and slave 1330 are also hardwired circuit blocks. Bus validation circuit 1325 and slave 1335, however, are implemented as soft circuit blocks or "soft Intellectual Property (IP)" within programmable circuitry portion 1304 of IC 1300.

Interconnect bus 1350 includes a master 1355, interconnect circuit 1360, bus validation circuits 1365 and 1370, and slaves 1375 and 1380. In the example of FIG. 13, each of master 1355, interconnect circuit 1360, bus validation circuits 1365 and 1370, and slaves 1375 and 1380 is implemented as a soft circuit block or soft IP within programmable circuitry portion 1304 of IC 1300.

It should be appreciated that further variations and permutations of soft and hardwired circuit blocks may be implemented when constructing an interconnect bus within an IC. The examples provided are for purposes of illustration and not intended to be limiting of the inventive arrangements disclosed herein.

The inventive arrangements described within this disclosure provide systems, circuits, and methods directed to detection of faults within interconnect bus circuitry. Bus validation circuits may be incorporated into the interconnect bus. Each slave, for example, is paired with a corresponding bus validation circuit. When placed in a test mode, the master operates in cooperation with the bus validation circuits to test the address space of each slave without the need to disturb or otherwise change the data stored within the slave. A safety register is used within each slave for purposes of conducting read and/or write operations. The master may test each address within the address range of each slave.

The bus validation circuit, working in cooperation with the master, ensures that only the safety register is read and/or written while bus validation operations are performed thereby ensuring the safety of any data within the slave. Further, as data need not be offloaded from a slave prior to validation operations and subsequently reloaded into the slave post validation operations, bus validation may be performed in a more timely manner than using other conventional techniques.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined within this disclosure, the terms "a" and "an" mean one or more than one. The term "plurality," as defined herein, means two or more than two. The term "another," as defined herein, means at least a second or more. The term "coupled," as defined herein, means connected, whether directly without any intervening elements or indirectly with one or more intervening elements, unless otherwise indicated. Two elements may also be coupled mechanically, electrically, or communicatively linked through a communication channel, pathway, network, or system.

As defined herein, the term "automatically" means without user intervention. As defined herein, the term "user" means a human being. The term "and/or" as defined herein means any and all possible combinations of one or more of the associated listed items. The terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. Although the terms "first," "second," etc. may be used herein to describe various elements, these elements should not be limited by these terms, as these terms are only used to distinguish one element from another unless the context indicates otherwise.

As defined herein, the term "if" means "when," "upon," "in response to determining," "in response to detecting," "responsive to determining," or "responsive to detecting," depending on the context. Similarly, the phrase "if it is determined" or the phrase "if [a stated condition or event] is detected," as defined herein, means "upon determining," "in response to determining," "responsive to determining," "upon detecting [the stated condition or event]," "in response to detecting [the stated condition or event]," or "responsive to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like may represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein, e.g., master operations, is suited.

One or more aspects further may be embedded in a computer program product, which includes all the features enabling the implementation of the methods described herein. The computer program product includes a computer-readable data storage medium. As defined herein, the phrase "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. In cases where directional arrows are included within a flow chart, such directional arrows may indicate another ordering of the blocks. For example, two or more blocks shown in succession may be executed substantially concurrently. In other cases, two or more blocks may sometimes be executed in the reverse order, depending upon the functionality involved. In still other cases, one or more blocks may be performed in an order different than pictured.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code may include, but is not limited to, a subroutine, a function, a procedure, an object method, an object implementation, an executable application, an applet, a servlet, source code, object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

A method of fault detection for an interconnect bus includes performing safety register validation including validating correct operation of a safety register in a slave circuit. The safety register is reserved for validation operations. The method also includes performing write bus validation where, over an address range of the slave circuit, received write addresses within the address range are stored in the safety register of the slave circuit and read back by a master circuit for validation. The method further includes performing read bus validation where, over the address range of the slave circuit, received read addresses within the address range are provided back to the master circuit for validation.

In one aspect, the safety register validation, the write bus validation, and the read bus validation utilize only the safety register of the address range of the slave circuit for validation operations.

Performing safety register validation may include reading a signature from the safety register and determining whether a fault is detected according to whether the signature read from the safety register matches an expected data signature.

Performing safety register validation also may include writing a data item to the safety register, reading data from the safety register, and determining whether a fault is detected according to whether the data item written to the safety register matches the data read from the safety register.

Performing write bus validation may include iteratively performing operations over the address range. The operations may include providing a write address from the master circuit to a data input of the slave circuit, providing an address of the safety register to an address input of the slave circuit causing the write address to be stored in the safety register, reading data stored in the safety register, and determining whether a fault is detected on the write bus of the interconnect bus according to whether the address written to the safety register matches the data read from the safety register.

Performing read bus validation may include receiving a read address sent from the master circuit over a read address channel of the read bus, providing the read address back to the master circuit on a read data channel of the read bus, and determining whether a fault is detected on the read bus according to whether the read address sent from the master circuit on the read address channel matches the read address provided back to the master circuit on the read data channel.

The method also may include providing an address of the safety register to an address input port of the slave circuit and preventing data read from the slave circuit from propagating to the master circuit.

In another aspect, a system includes a write bus validation circuit configured for operation on a write bus of an interconnect bus. The write bus validation circuit includes a write address master input, a write data master input, a write address slave output, and a write data slave output. The write bus validation circuit further includes write bus switching circuitry coupled to the write address master input, the write data master input, the write address slave output, and the write data slave output. Responsive to initiation of a test mode in the write bus validation circuit, the write bus switching circuitry is configured to provide write addresses within an address range of a slave circuit received at the write address master input to the write data slave output and provide an address of a safety register of a slave circuit from the write address slave output.

The write bus validation circuit may include a first memory storing the address of the safety register. In the test mode, the write bus switching circuitry is configured to decouple the write address master input from the write address slave output, decouple the write data master input from the write data slave output, couple the write address master input to the write data slave output, and output the address of the safety register from the first memory to the write address slave output.

The write bus validation circuit may further include a first control signal port and a second control signal port coupled to the first control signal port. The bus validation circuit may be configured to pass control signals unaltered between the first control signal port and the second control signal port.

The system may further include a read bus validation circuit configured for operation on a read bus of the interconnect bus. The read bus validation circuit may include a read address master input, a read data master output, a read data slave input, and a read address slave output. The read bus validation circuit may also include read bus switching circuitry coupled to the read address master input, the read data master output, the read data slave input, and the read address slave output. Responsive to initiation of the test mode in the read bus validation circuit, the read bus switching circuitry is configured to provide read addresses within the address range of the slave circuit received at the read address master input to the read data master output.

The read bus switching circuitry may be configured to decouple the read address master input from the read address slave output, decouple the read data master input from the read data slave output, and couple the read address master input to the read data master output.

The read bus validation circuit further may include a second memory storing the address of the safety register. In the test mode, the read bus switching circuit is configured to couple the second memory to the read address slave output, output the address of the safety register from the second memory to the write address slave output, and prevent data read from the slave circuit from propagating to a master circuit.

The read bus validation circuit may further include a third control signal port and a fourth control signal port coupled to the third control signal port. The read bus validation circuit is configured to pass control signals unaltered between the third control signal port and the fourth control signal port.

In another aspect, a system includes a read bus validation circuit configured for operation on a read bus of an interconnect bus. The read bus validation circuit includes a read address master input, a read data master output, a read data slave input, and a read address slave output. The read bus validation circuit further includes read bus switching circuitry coupled to the read address master input, the read data master output, the read data slave input, and the read address slave output. Responsive to initiation of a test mode in the read bus validation circuit, the read bus switching circuitry is configured to provide read addresses within an address range of a slave circuit received at the read address master input to the read data master output.

The read bus switching circuit may be configured to decouple the read address master input from the read address slave output, decouple the read data master input from the read data slave output, and couple the read address master input to the read data master output.

The read bus validation circuit may include a first memory storing an address of a safety register. The read bus switching circuit may be configured to couple the first memory to the read address slave output, output the address of the safety register from the second memory to the read address slave output, and prevent data read from the slave circuit from propagating to a master circuit.

The read bus validation circuit further may include a first control signal port and a second control signal port coupled to the first control signal port. The read bus validation circuit may be configured to pass control signals unaltered between the first control signal port and the second control signal port.

The system may also include a write bus validation circuit configured for operation on a write bus of an interconnect bus. The write bus validation circuit may include a write address master input, a write data master input, a write address slave output, and a write data slave output. The write bus validation circuit may also include write bus switching circuitry coupled to the write address master input, the write data master input, the write address slave output, and the write data slave output. Responsive to initiation of a test mode in the write bus validation circuit, the write bus switching circuitry is configured to provide write addresses within an address range of a slave circuit received at the write address master input to the write data slave output and provide an address of a safety register of the slave circuit from the write address slave output.

The write bus validation circuit may also include a second memory storing the address of the safety register. The write bus switching circuit may be configured to decouple the write address master input from the write address slave output, decouple the write data master input from the write data slave output, couple the write address master input to the write data slave output, and output the address of the safety register from the second memory to the write address slave output.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method of fault detection for an interconnect bus, comprising:
   performing safety register validation comprising validating correct operation of a safety register in a slave circuit;
   wherein the safety register is reserved for validation operations;
   performing write bus validation where, over an address range of the slave circuit, received write addresses within the address range are stored in the safety register of the slave circuit and read back by a master circuit for validation; and
   performing read bus validation where, over the address range of the slave circuit, received read addresses within the address range are provided back to the master circuit for validation.

2. The method of claim 1, wherein the safety register validation, the write bus validation, and the read bus validation utilize only the safety register of the address range of the slave circuit for validation operations.

3. The method of claim 1, wherein performing safety register validation comprises:
   reading a signature from the safety register; and
   determining whether a fault is detected according to whether the signature read from the safety register matches an expected data signature.

4. The method of claim 3, wherein performing safety register validation further comprises:
   writing a data item to the safety register;
   reading data from the safety register; and
   determining whether a fault is detected according to whether the data item written to the safety register matches the data read from the safety register.

5. The method of claim 1, wherein performing write bus validation comprises iteratively performing operations over the address range, wherein the operations comprise:
   providing a write address from the master circuit to a data input of the slave circuit;
   providing an address of the safety register to an address input of the slave circuit causing the write address to be stored in the safety register;
   reading data stored in the safety register; and
   determining whether a fault is detected on the write bus of the interconnect bus according to whether the address written to the safety register matches the data read from the safety register.

6. The method of claim 1, wherein performing read bus validation comprises:
   receiving a read address sent from the master circuit over a read address channel of the read bus;
   providing the read address back to the master circuit on a read data channel of the read bus; and
   determining whether a fault is detected on the read bus according to whether the read address sent from the master circuit on the read address channel matches the read address provided back to the master circuit on the read data channel.

7. The method of claim 6, further comprising:
   providing an address of the safety register to an address input port of the slave circuit; and
   preventing data read from the slave circuit from propagating to the master circuit.

8. A system, comprising:
   a write bus validation circuit configured for operation on a write bus of an interconnect bus;
   wherein the write bus validation circuit comprises:
      a write address master input, a write data master input, a write address slave output, and a write data slave output; and
      write bus switching circuitry coupled to the write address master input, the write data master input, the write address slave output, and the write data slave output;
      wherein, responsive to initiation of a test mode in the write bus validation circuit, the write bus switching circuitry is configured to provide write addresses within an address range of a slave circuit received at the write address master input to the write data slave output and provide an address of a safety register of a slave circuit from the write address slave output.

9. The system of claim 8, wherein the write bus validation circuit further comprises:
   a first memory storing the address of the safety register;
   wherein, in the test mode, the write bus switching circuitry is configured to:
   decouple the write address master input from the write address slave output;
   decouple the write data master input from the write data slave output;
   couple the write address master input to the write data slave output; and
   output the address of the safety register from the first memory to the write address slave output.

10. The system of claim 9, wherein the write bus validation circuit further comprises:
a first control signal port; and
a second control signal port coupled to the first control signal port;
wherein the bus validation circuit is configured to pass control signals unaltered between the first control signal port and the second control signal port.

11. The system of claim 8, further comprising:
a read bus validation circuit configured for operation on a read bus of the interconnect bus;
wherein the read bus validation circuit comprises:
a read address master input, a read data master output, a read data slave input, and a read address slave output; and
read bus switching circuitry coupled to the read address master input, the read data master output, the read data slave input, and the read address slave output;
wherein, responsive to initiation of the test mode in the read bus validation circuit, the read bus switching circuitry is configured to provide read addresses within the address range of the slave circuit received at the read address master input to the read data master output.

12. The system of claim 11, wherein the read bus switching circuit is configured to:
decouple the read address master input from the read address slave output;
decouple the read data master input from the read data slave output; and
couple the read address master input to the read data master output.

13. The system of claim 12, wherein the read bus validation circuit further comprises:
a first memory storing the address of the safety register;
wherein, in the test mode, the read bus switching circuit is configured to:
couple the second memory to the read address slave output;
output the address of the safety register from the first memory to the write address slave output; and
prevent data read from the slave circuit from propagating to a master circuit.

14. The system of claim 12, wherein the read bus validation circuit further comprises:
a third control signal port; and
a fourth control signal port coupled to the third control signal port;
wherein the read bus validation circuit is configured to pass control signals unaltered between the third control signal port and the fourth control signal port.

15. A system, comprising:
a read bus validation circuit configured for operation on a read bus of an interconnect bus;
wherein the read bus validation circuit comprises:
a read address master input, a read data master output, a read data slave input, and a read address slave output; and
read bus switching circuitry coupled to the read address master input, the read data master output, the read data slave input, and the read address slave output;
wherein, responsive to initiation of a test mode in the read bus validation circuit, the read bus switching circuitry is configured to provide at least one of read addresses within an address range of a slave circuit received at the read address master input or an address of a safety register to the read data master output.

16. The system of claim 15, wherein the read bus switching circuit is configured to:
decouple the read address master input from the read address slave output;
decouple the read data master input from the read data slave output; and
couple the read address master input to the read data master output.

17. The system of claim 16, wherein the read bus validation circuit comprises:
a first memory storing the address of the safety register;
wherein the read bus switching circuit is configured to:
couple the first memory to the read address slave output;
output the address of the safety register from the second memory to the read address slave output; and
prevent data read from the slave circuit from propagating to a master circuit.

18. The system of claim 16, wherein the read bus validation circuit further comprises:
a first control signal port;
a second control signal port coupled to the first control signal port; and
wherein the read bus validation circuit is configured to pass control signals unaltered between the first control signal port and the second control signal port.

19. The system of claim 15, further comprising:
a write bus validation circuit configured for operation on a write bus of an interconnect bus;
wherein the write bus validation circuit comprises:
a write address master input, a write data master input, a write address slave output, and a write data slave output; and
write bus switching circuitry coupled to the write address master input, the write data master input, the write address slave output, and the write data slave output;
wherein, responsive to initiation of a test mode in the write bus validation circuit, the write bus switching circuitry is configured to provide write addresses within an address range of a slave circuit received at the write address master input to the write data slave output and provide the address of the safety register of the slave circuit from the write address slave output.

20. The system of claim 19, wherein the write bus validation circuit further comprises:
a first memory storing the address of the safety register;
wherein the write bus switching circuit is configured to:
decouple the write address master input from the write address slave output;
decouple the write data master input from the write data slave output;
couple the write address master input to the write data slave output; and
output the address of the safety register from the first memory to the write address slave output.

* * * * *